United States Patent
Motai et al.

(10) Patent No.: US 9,176,756 B2
(45) Date of Patent: Nov. 3, 2015

(54) COMPUTER SYSTEM

(71) Applicant: Renesas Electronics Corporation, Kawasaki-shi (JP)

(72) Inventors: Hirotaka Motai, Tokyo (JP); Yasuhiro Tawara, Kawasaki (JP); Koji Adachi, Kawasaki (JP); Hitoshi Suzuki, Kawasaki (JP)

(73) Assignee: RENESAS ELECTRONICS CORPORATION, Kawasaki-Shi, Kanagawa (JP)

( * ) Notice: Subject to any disclaimer, the term of this patent is extended or adjusted under 35 U.S.C. 154(b) by 342 days.

(21) Appl. No.: 13/901,482

(22) Filed: May 23, 2013

(65) Prior Publication Data

US 2013/0332925 A1 Dec. 12, 2013

(30) Foreign Application Priority Data

Jun. 12, 2012 (JP) ................................. 2012-132871

(51) Int. Cl.
- G06F 9/455 (2006.01)
- G06F 11/07 (2006.01)
- G06F 11/14 (2006.01)

(52) U.S. Cl.
CPC ............ *G06F 9/455* (2013.01); *G06F 9/45533* (2013.01); *G06F 11/0712* (2013.01); *G06F 11/0793* (2013.01); *G06F 11/1438* (2013.01); *G06F 11/1484* (2013.01)

(58) Field of Classification Search
None
See application file for complete search history.

(56) References Cited

U.S. PATENT DOCUMENTS

| | | | | |
|---|---|---|---|---|
| 5,481,276 A | * | 1/1996 | Dickey et al. | 345/698 |
| 6,643,727 B1 | * | 11/2003 | Arndt et al. | 710/314 |
| 7,085,866 B1 | * | 8/2006 | Hobson et al. | 710/117 |
| 2003/0204780 A1 | * | 10/2003 | Dawkins et al. | 714/24 |
| 2008/0126852 A1 | * | 5/2008 | Brandyberry et al. | 714/8 |
| 2008/0195883 A1 | * | 8/2008 | Lee et al. | 713/500 |
| 2009/0119551 A1 | * | 5/2009 | Boyd et al. | 714/48 |
| 2009/0144579 A1 | * | 6/2009 | Swanson | 714/3 |
| 2009/0248949 A1 | * | 10/2009 | Khatri et al. | 711/6 |
| 2009/0300636 A1 | * | 12/2009 | Ringseth et al. | 718/104 |
| 2010/0082944 A1 | * | 4/2010 | Adachi et al. | 712/200 |
| 2010/0088704 A1 | * | 4/2010 | Ringseth et al. | 718/102 |
| 2010/0312992 A1 | * | 12/2010 | Wakabayashi et al. | 712/214 |
| 2011/0138219 A1 | * | 6/2011 | Walton et al. | 714/3 |
| 2011/0197003 A1 | * | 8/2011 | Serebrin et al. | 710/267 |
| 2011/0299424 A1 | * | 12/2011 | Rikitake et al. | 370/254 |
| 2011/0307889 A1 | * | 12/2011 | Moriki et al. | 718/1 |
| 2011/0320860 A1 | * | 12/2011 | Coneski et al. | 714/5.1 |
| 2012/0331300 A1 | * | 12/2012 | Das et al. | 713/176 |
| 2013/0275638 A1 | * | 10/2013 | Serebrin et al. | 710/267 |
| 2013/0332922 A1 | * | 12/2013 | Entezari et al. | 718/1 |

FOREIGN PATENT DOCUMENTS

| | | |
|---|---|---|
| JP | 2003-330817 A | 11/2003 |
| JP | 2007-323142 A | 12/2007 |
| JP | 2010-86129 A | 4/2010 |

\* cited by examiner

*Primary Examiner* — Emerson Puente
*Assistant Examiner* — Mehran Kamran
(74) *Attorney, Agent, or Firm* — McGinn IP Law Group, PLLC

(57) ABSTRACT

There is a need to provide a computer system capable of preventing a failure from propagating and recovering from the failure.

VCPU#0 through VCPU#2 each operate different OS's. VCPU#0 operates a management OS that manages the other OS's. When notified of bus error occurrence, a virtual CPU execution portion 201 operates only VCPU#0 regardless of an execution sequence stored in schedule register A. VCPU#0 reinitializes a bus where an error occurred.

4 Claims, 10 Drawing Sheets

FIG. 6

| IO | COUPLING BUS | | | OS | | |
|---|---|---|---|---|---|---|
| | BUS 111 | BUS 112 | BUS 113 | MANAGEMENT OS | RTOS | AUDIOVISUAL PROCESSING OS |
| IO 130 | ○ | | | | | |
| IO 131 | | ○ | | | ● | |
| IO 132 | | ○ | | | ● | |
| IO 133 | | | ○ | | | ● |
| IO 134 | | | ○ | | | ● |
| IO 135 | | | ○ | | | ● |
| BUS BRIDGE 120 | | | | | | |
| BUS BRIDGE 121 | | | | | | |
| BUS BRIDGE 122 | ○ | | | | | (USE IO COUPLED TO BUS 113) ● |

○ : COUPLING DESTINATION    ● : OS USED

COMPUTER SYSTEM

CROSS-REFERENCE TO RELATED APPLICATIONS

The disclosure of Japanese Patent Application No. 2012-132871 filed on Jun. 12, 2012 including the specification, drawings and abstract is incorporated herein by reference in its entirety.

BACKGROUND

The present invention relates to a computer system. More particularly, the invention relates to a computer system capable of operating multiple virtual machines.

A virtual machine allows single hardware to provide multiple computer systems, namely, a highly reliable, real-time computer system such as a control system and a high-performance computer system for audiovisual processing.

The virtual machine includes virtual components such as a virtual central processing unit (CPU), virtualized physical memory, and a virtual IO device. The virtual machine implements the virtual components by allowing them to be dedicated to or share physical components (physical CPU, physical memory, and physical IO device).

An abnormal state due to a device (hereinafter referred to as IO) error may occur under an environment that uses the virtual machine. For example, the method proposed in patent document 1 detects the error and prevent an abnormal state from expanding. The method provides an association table to associate IOs used for operating systems (OS's) and a means to detect IO errors, specifies a virtual machine from the association table corresponding to an error, if any, and stops only the specified virtual machine.

A multithreaded processor is provided for computer systems such as control systems that require highly real-time capability. The multithreaded processor divides the processor usage time into predetermined time intervals or instructions and performs multiple processes by switching them. Since processes are switched during execution, the multithreaded processor can reliably ensure the time for real-time processing while performing audiovisual multimedia processes. For example, the method proposed in patent document 2 accelerates specific processes. The method uses multiple scheduling registers for a scheduling process of the multithreaded processor and changes ratios of threads available for normal operation and an interrupt process.

For example, the method proposed in patent document 3 generates an interrupt via a bus bridge if an IO error causes an abnormal state. When an initialization instruction is issued to the OS or a device driver, the software such as the OS or the device driver reinitializes the communication control portion.

Patent Document 1: Japanese Unexamined Patent Publication No. 2007-323142

Patent Document 2: Japanese Unexamined Patent Publication No. 2010-86129

Patent Document 3: Japanese Unexamined Patent Publication No. 2003-330817

SUMMARY

The multithreaded processor as described in patent document 2 makes it easy to simultaneously control OS's running on multiple virtual machines. However, the following problem occurs when allowing the same hardware to run multiple OS's each of which is originally designed to run on distinct hardware.

Suppose a case where an abnormal access from an OS (assumed to be OS-A) on the virtual machine may allow the corresponding IO (IO-A) to cause an error. In such a case, stopping OS-A can prevent an access to IO-A as described in patent document 1. An IO error can be recovered by notifying the error to OS-A as described in patent document 3. If an IO error occurs, however, the error on IO-A may propagate to a bus (bus x) coupled to IO-A. In this case, another OS (assumed to be OS-B) may use the other IO (IO-B) coupled to bus x and may access IO-B because OS-B does not recognize that bus x is faulty. As a result, OS-B may abnormally terminate.

The present invention has been made to solve the above-mentioned problem. It is an object of the invention to provide a computer system capable of preventing a failure from propagating and recovering from the failure.

To solve the above-mentioned problem, the present invention provides a multithreaded processor and an interrupt controller to notify a bus error occurrence. The multithreaded processor includes: a schedule register that settles a sequence of performing a plurality of virtual CPUs and stores data for virtual CPUs to be performed; and a virtual CPU execution portion that performs virtual CPUs according to a sequence settled by the schedule register. Virtual CPUs operate different OS's and include a first virtual CPU that operates a management OS to manage other OS's. When notified of bus error occurrence, the virtual CPU execution portion operates only the first virtual CPU regardless of an execution sequence settled in the schedule register. The first virtual CPU reinitializes a bus where an error occurred.

The invention can prevent a failure from propagating and recover from the failure.

BRIEF DESCRIPTION OF THE DRAWINGS

FIG. 6 illustrates an IO-using OS management table;

DETAILED DESCRIPTION

Embodiments of the present invention will be described with reference to the accompanying drawings.

First Embodiment

Hardware Configuration

Figure 1:
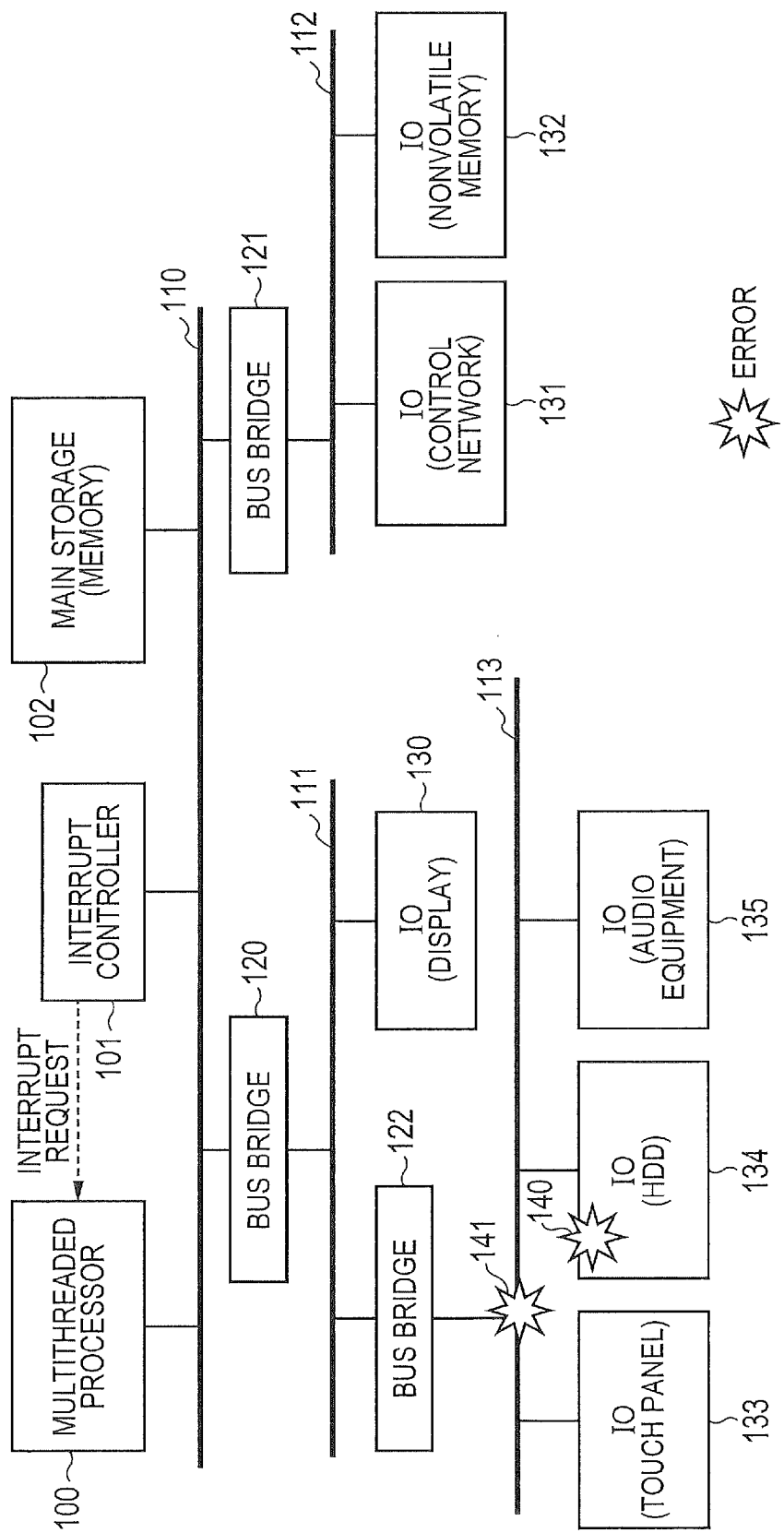
FIG. 1 illustrates a hardware configuration of the computer system according to a first embodiment.

FIG. 1 illustrates a hardware configuration of the computer system according to the first embodiment.

As illustrated in FIG. 1, the computer system includes a multithreaded processor 100, an interrupt controller 101, a main storage (memory) 102, bus bridges 120, 121, and 122, IOs 131 through 135, buses 110 through 113.

The multithreaded processor 100 performs multiple virtual CPUs by switching them from one to the others on a time basis. The software configuration to be described later will cover the multithreaded processor 100 in more detail.

The interrupt controller 101 receives interrupt requests from the IOs 130 through 135, the bus bridges 120 through 122, and the main storage 102 and transmits the interrupt requests to the multithreaded processor 100. The interrupt controller 101 may be included in the multithreaded processor 100. Each interrupt factor may be given a priority and a VCPU number.

The main storage 102 uses random access memory (RAM). The main storage 102 stores programs or data used for the multithreaded processor 100.

The bus 110 couples the multithreaded processor 100, the interrupt controller 101, the main storage 102, and the bus bridges 120 and 121 with each other.

The bus 111 couples the bus bridges 120 and 122, and the IO 130.

The bus 112 couples the bus bridge 121, and IOs 131 and 132.

The bus 113 couples the bus bridge 122, and IOs 133 through 135.

The bus bridge 120 intermediates communication between the buses 110 and 111. The bus bridge 120 detects an error on the bus 111 and notifies the error to the interrupt controller 101 coupled to the bus 110.

The bus bridge 121 intermediates communication between the buses 110 and 112. The bus bridge 121 detects an error on the bus 112 and notifies the error to the interrupt controller 101 coupled to the bus 110.

The bus bridge 122 intermediates communication between the buses 111 and 113. The bus bridge 122 detects an error on the bus 113 and notifies the error to the interrupt controller 101 coupled to the bus 110.

The IOs 130 through 135 represent a display, a control network, nonvolatile memory, a touch panel, a hard disk drive (HDD), and an audio device. While the embodiment shows an example of coupling these devices, some of them may be omissible. In addition, some of the other devices such as read only memory (ROM), a floppy disk drive (FDD), a Secure Digital (SD) memory card, a Compact Flash (CF, registered trademark) card, and a communication board (wired or wireless) may be coupled.

The embodiment assumes that an error 140 occurs on the IO 134 and an error 141 occurs on the bus 113.

Software Configuration

Figure 2:
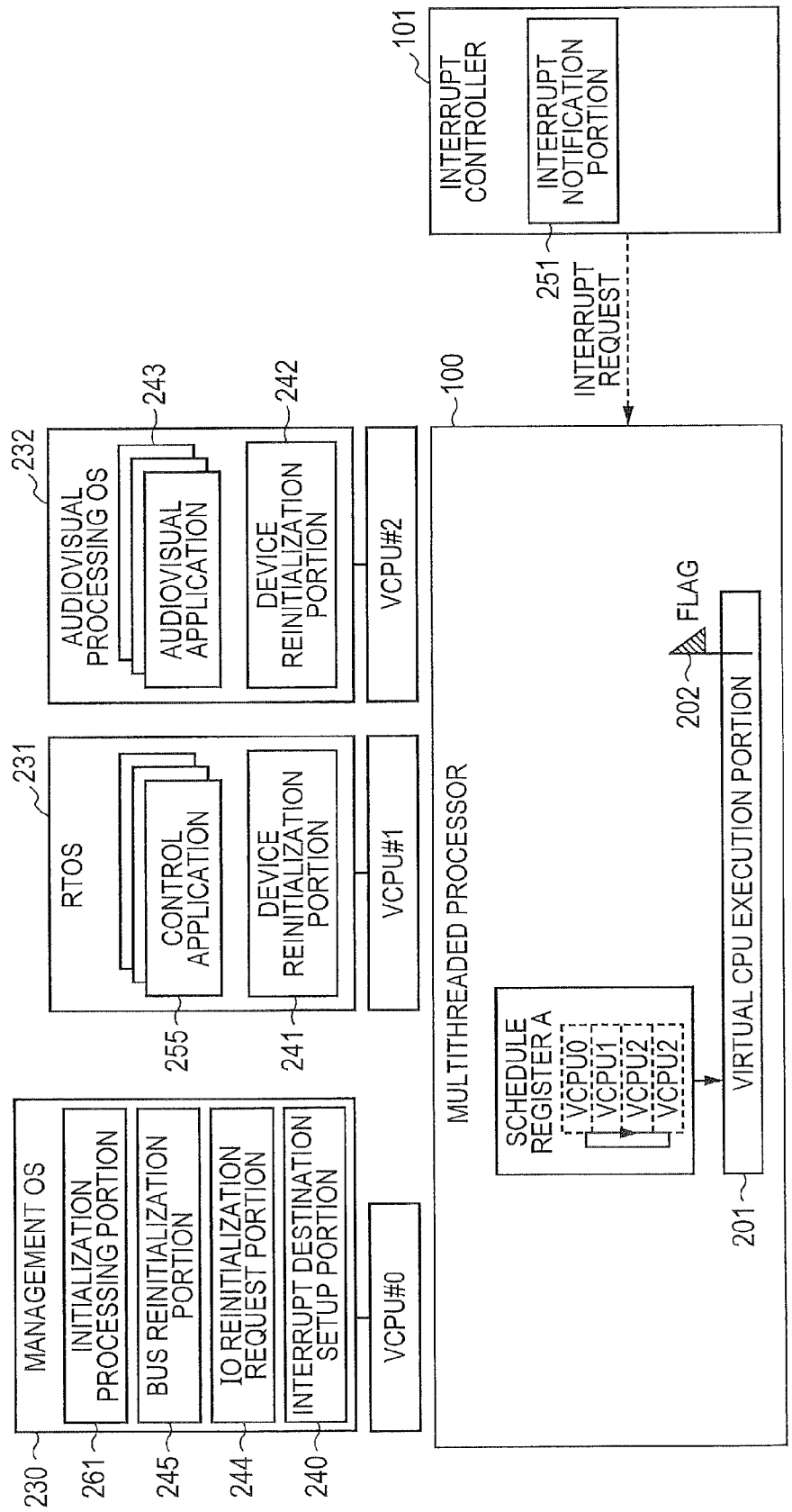
FIG. 2 illustrates a software configuration of the computer system according to the first embodiment.

FIG. 2 illustrates a software configuration of the computer system according to the first embodiment.

VCPUs 220 through 222 represent virtual CPUs or schematic CPUs depicted as process images periodically performed by the multithreaded processor 100.

The multithreaded processor 100 is provided with schedule register A including multiple register groups.

Schedule register A includes a sequence table and a register group. The sequence table specifies a sequence of virtual CPUs to be performed. The register group stores data used for the virtual CPU to be performed. According to the embodiment, the sequence table is configured to cyclically perform VCPU#0, VCPU#1, VCPU#2, and VCPU#2 in order. VCPU#0, VCPU#1, and VCPU#2 are provided with corresponding register groups. The embodiment describes that the multithreaded processor includes three register groups (VCPU#0 through #2). However, the multithreaded processor may include two register groups or more.

A virtual CPU execution portion 201 includes a flag 202 indicating whether to select the schedule register.

When the flag 202 is set, the virtual CPU execution portion 201 references the sequence table in the schedule register, changes a VCPU to be selected on a specified time or instruction basis, and selects a register group corresponding to the selected VCPU to perform the selected VCPU.

When the flag 202 is reset, the virtual CPU execution portion 201 selects a register group corresponding to VCPU#0 to perform VCPU#0.

The interrupt controller 101 includes an interrupt notification portion 251.

The interrupt notification portion 251 receives an interrupt request that may be issued from the IOs 130 through 135, the bus bridges 120 through 122, or the main storage 102 if they encounter an error. The interrupt notification portion 251 transmits the interrupt request to the multithreaded processor 100.

VCPU#0 operates a management OS 230 that manages the other OS's. VCPU#0 performs programs running under the management OS 230 to function as an initialization processing portion 261, a bus reinitialization portion 245, an IO reinitialization request portion 244, and an interrupt destination setup portion 240.

The initialization processing portion 261 performs processes for the management OS.

The interrupt destination setup portion 240 provides settings for interrupts from the interrupt notification portion 251.

The IO reinitialization request portion 244 requests device reinitialization portions 241 and 242 to reinitialize related devices.

VCPU#1 operates a real-time (RT) OS 231. VCPU#1 performs programs running under the RTOS 231 to function as multiple control applications 255 and the device reinitialization portion 241.

The control application 255 performs a control function.

The device reinitialization portion 241 performs processes to reinitialize devices used by VCPU#1.

VCPU#2 operates an audiovisual processing OS 232. VCPU#2 performs programs running under the audiovisual processing OS 232 to function as multiple audiovisual applications 243 and the device reinitialization portion 242.

The audiovisual application 243 performs audiovisual processes.

The device reinitialization portion 242 performs processes to reinitialize IOs used by VCPU#2.

Operations

The following describes operations of the computer system according to the first embodiment.

Figure 3:
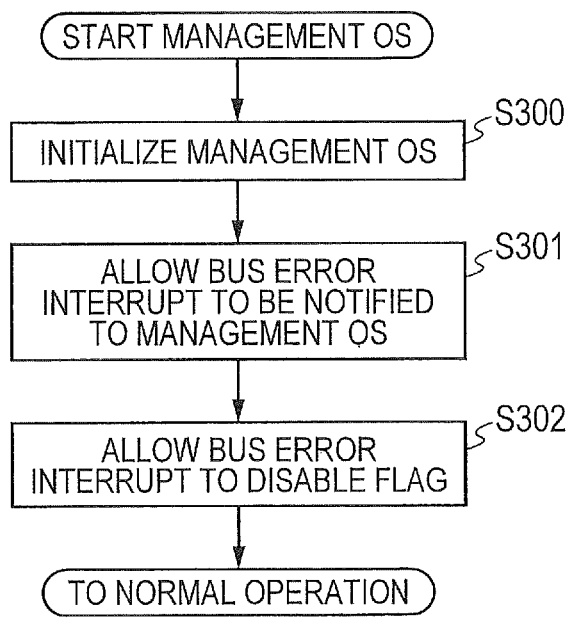
FIG. 3 is a flowchart illustrating a process to start the computer system according to the first embodiment.

FIG. 3 is a flowchart illustrating a process to start the computer system according to the first embodiment. VCPU#0 starts the computer system.

The initialization processing portion 261 normally initializes management OS 230 (S300).

The interrupt destination setup portion 240 configures error notification (issued from the bus bridges 120 through 122) from the buses 111 through 113 to be notified to the management OS 230 (S301).

The interrupt destination setup portion 240 configures the flag 202 to be disabled due to a bus error interrupt (S302).

The management OS then proceeds to normal operation.

Figure 4:
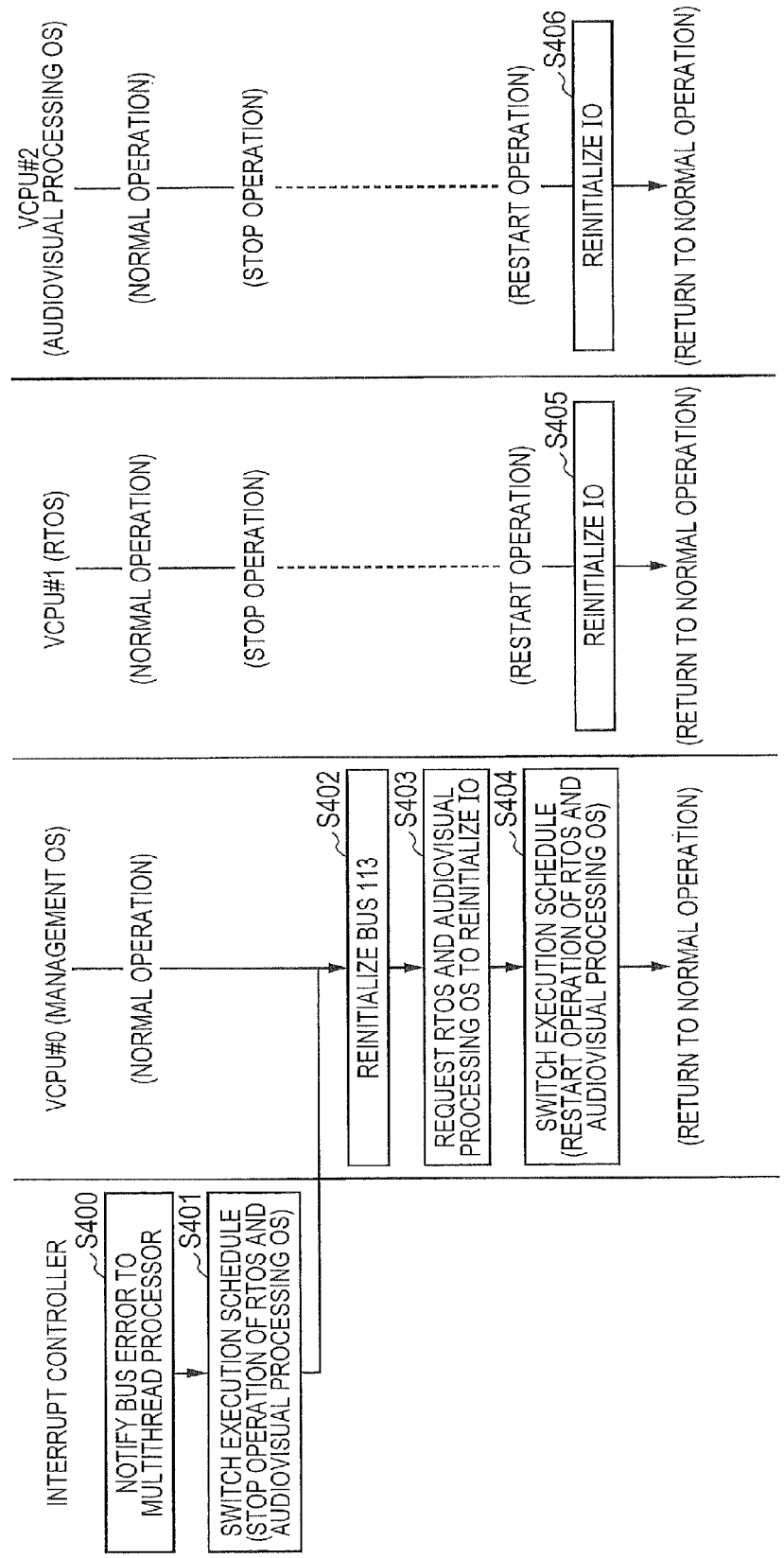
FIG. 4 is a flowchart illustrating a process to recover from an error on a bus 113 according to the first embodiment.

FIG. 4 is a flowchart illustrating a process to recover from an error on a bus 113 according to the first embodiment.

If an error occurs on the bus 113, the bus bridge 122 notifies the error occurrence to the interrupt controller 101. The interrupt controller 101 notifies the multithreaded processor 100 of the interrupt (S400).

The interrupt notification portion 251 of the interrupt controller 101 disables the flag 202. The virtual CPU execution portion 201 accordingly changes the operation of sequentially selecting VCPU#0 through VCPU#2 using schedule register A to the operation of only VCPU#0 (S401). At S401, VCPU#1 and VCPU#2 stop operating.

The bus reinitialization portion 245 initializes the bus 113 (S402). At S402, the error occurred on the bus 113 is removed.

The IO reinitialization request portion 244 requests the RTOS 231 and the audiovisual processing OS 232 to reinitialize devices (S403).

The virtual CPU execution portion 201 sets the flag 202 to change the current operation to the operation of sequentially selecting VCPU#0 through VCPU#2 using schedule register A (S404). At S404, VCPU#1 and VCPU#2 restart operating.

The device reinitialization portion 241 reinitializes devices used by the RTOS 231 (S405). The device reinitialization portion 242 reinitializes devices used by the audiovisual processing OS 232 (S406). As a result, the bus and the devices coupled to the bus are restored to normal states. Thereafter, each OS returns to normal operation.

Effect

According to the embodiment, all OS's stop when the bus is reinitialized. Therefore, the embodiment can safely remove a bus error. Even if the OS's do not complete a procedure of making a request to IOs (e.g., wait for DMA completion), requesting the OS's to reinitialize IOs ensures a repeated request to IOs. The OS can restart safely.

Second Embodiment

Hardware Configuration

A hardware configuration of the computer system according to the second embodiment equals the hardware configuration according to the first embodiment and a description is omitted for simplicity. However, the hardware configuration of the computer system according to the second embodiment assumes that IOs (devices) used for the RTOS are coupled to buses other than those used for the remaining IOs (devices).

Software Configuration

Figure 5:
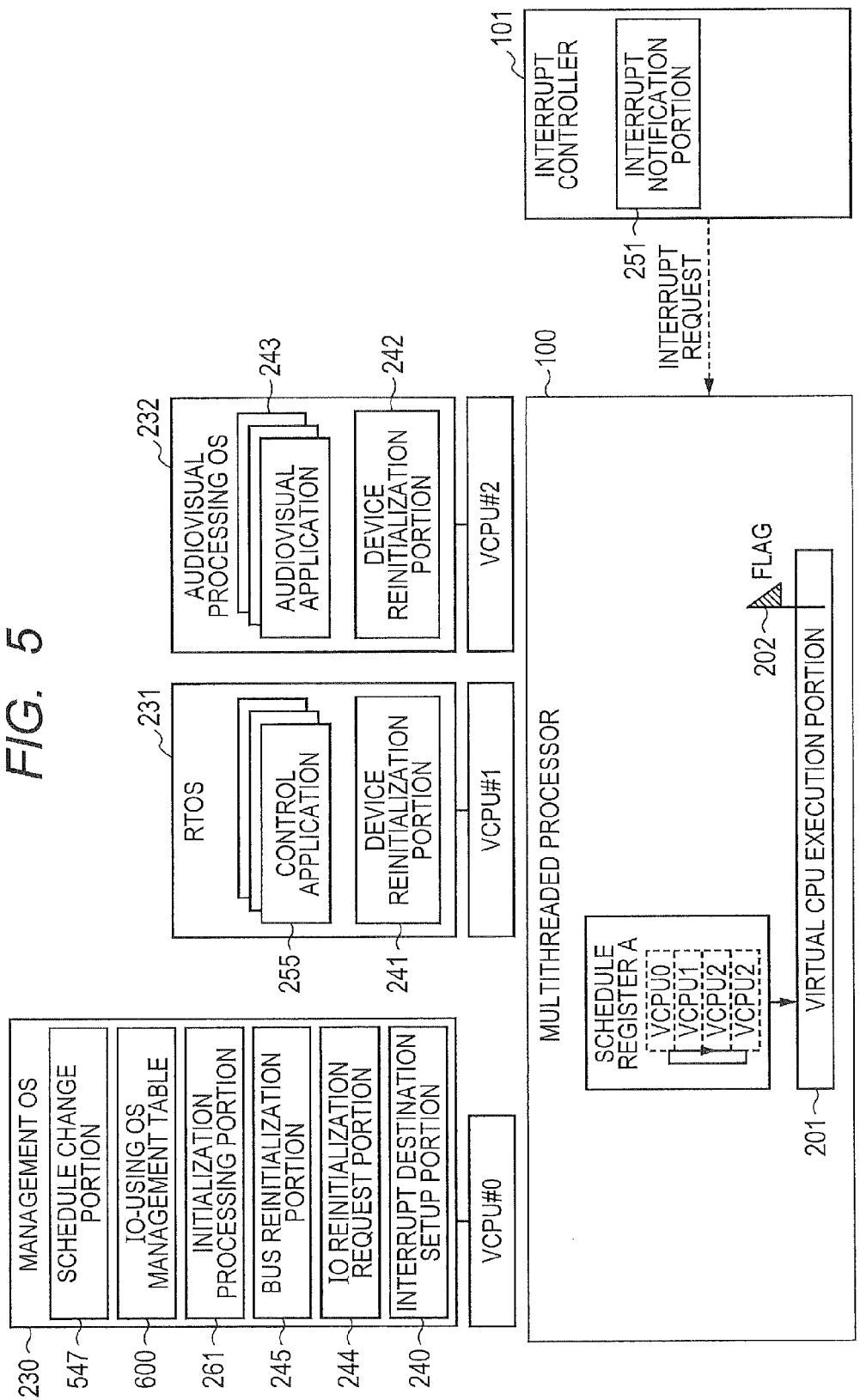
FIG. 5 illustrates a software configuration of the computer system according to a second embodiment.

FIG. 5 illustrates a software configuration of the computer system according to the second embodiment.

The software configuration according to the second embodiment differs from the software according to the first embodiment in the following.

When a bus error occurs, the schedule change portion 547 references the current schedule register based on the IO-using OS management table 600 and changes the VCPU number to VCPU#0 for operating the OS that uses a device (IO) coupled to the bus subject to the error.

FIG. 6 illustrates the IO-using OS management table.

The table shows the relationship in which each IO (column 601) is coupled to a coupling bus (column 602) and the OS (column 603) uses the corresponding IO. According to the embodiment, the table uses a blank cell and a white circle to indicate whether the bus is coupled. The table uses a blank cell and a black circle to indicate whether the IO is used. Alternatively, the table may use numbers (e.g., 0 and 1) for management.

According to the IO-using OS management table, for example, the IO 130 is coupled to the bus 111 and uses the audiovisual processing OS. The IO 131 is coupled to the bus 112 and uses the RTOS.

Operations

The following describes operations of the computer system according to the second embodiment.

A procedure to start the computer system according to the second embodiment equals the first embodiment described with reference to FIG. 3 and a description is omitted for simplicity.

Figure 7:
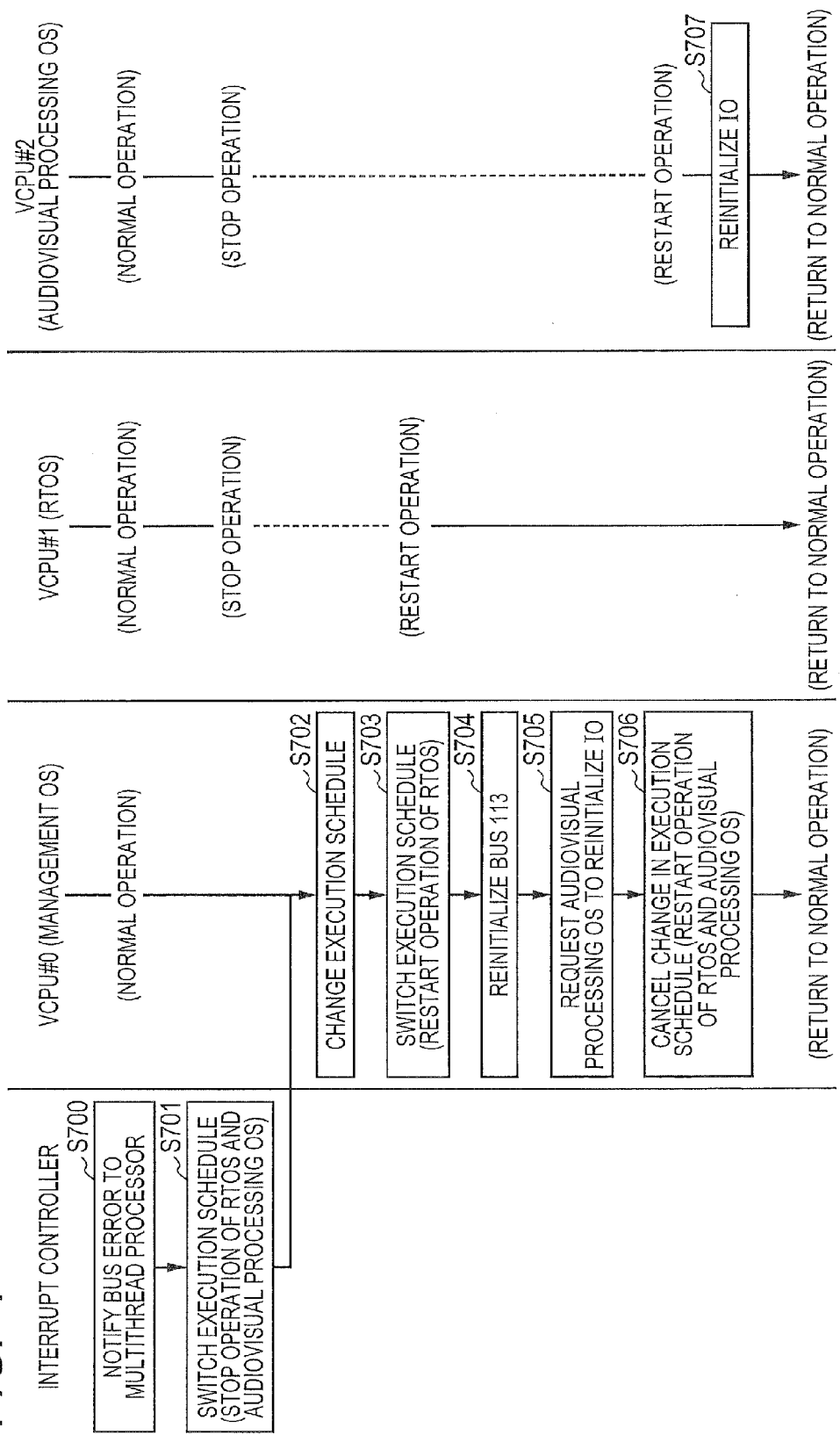
FIG. 7 is a flowchart illustrating a process to recover from an error on the bus 113 according to the second embodiment.

FIG. 7 is a flowchart illustrating a process to recover from an error on the bus 113 according to the second embodiment.

If an error occurs on the bus 113, the bus bridge 122 notifies the interrupt controller 101 of the error occurrence. The interrupt controller 101 notifies the interrupt to the multithreaded processor 100 (S700).

The interrupt notification portion 251 of the interrupt controller 101 disables the flag 202. The virtual CPU execution portion 201 accordingly changes the operation of sequentially selecting VCPU#0 through VCPU#2 using schedule register A to the operation of only VCPU#0 (S701). At S401, VCPU#1 and VCPU#2 stop operating.

The schedule change portion 547 references the IO-using OS management table 600 and extracts all OS's (only the audiovisual processing OS 232 in this example) that use IOs (IOs 133 through 135 in this example) coupled to the bus 113. The schedule change portion 547 rewrites a virtual CPU (one or more of VCPU#0 through VCPU#2) running under the extracted OS's to VCPU#0 in schedule register A (S702).

The schedule change portion 547 sets the flag 202 to change the current operation to the operation of sequentially selecting VCPLTs using schedule register A (S703). At S703, VCPU#1 restarts operating.

The bus reinitialization portion 245 initializes the bus 113 (S704). At S704, the error occurred on the bus 113 is removed.

The IO reinitialization request portion 244 requests the audiovisual processing OS 232 to reinitialize devices (S705).

The schedule change portion 547 changes the VCPU (VCPU#0 from VCPU#2 in this example) changed in a schedule register at S702 to the original state (S706). In this example, the schedule change portion 547 returns the changed VCPU#0 to VCPU#2. At S706, VCPU#1 restarts operating.

The device reinitialization portion 242 reinitializes a device used for the audiovisual processing OS 232. As a result, the bus and the devices coupled to the bus are restored to normal states. Thereafter, the audiovisual processing OS 232 returns to normal operation.

Effect

As described above, the embodiment reinitializes a bus by stopping all OS's related to the bus and is therefore capable of safely removing a bus error. In addition, OS's unrelated to the bus can continue operating. The real-time process can restart earlier than the first embodiment. Even if the OS related to the bus does not complete a procedure of making a request to IOs (e.g., wait for DMA completion), requesting that OS to reinitialize IOs ensures a repeated request to IOs. The OS can restart safely.

Third Embodiment

Hardware Configuration

A hardware configuration of the computer system according to the third embodiment equals the hardware configuration according to the first embodiment and a description is omitted for simplicity. However, the hardware configuration of the computer system according to the third embodiment assumes that IOs (devices) used for the RTOS are coupled to buses other than those used for the remaining IOs (devices).

Software Configuration

Figure 8:
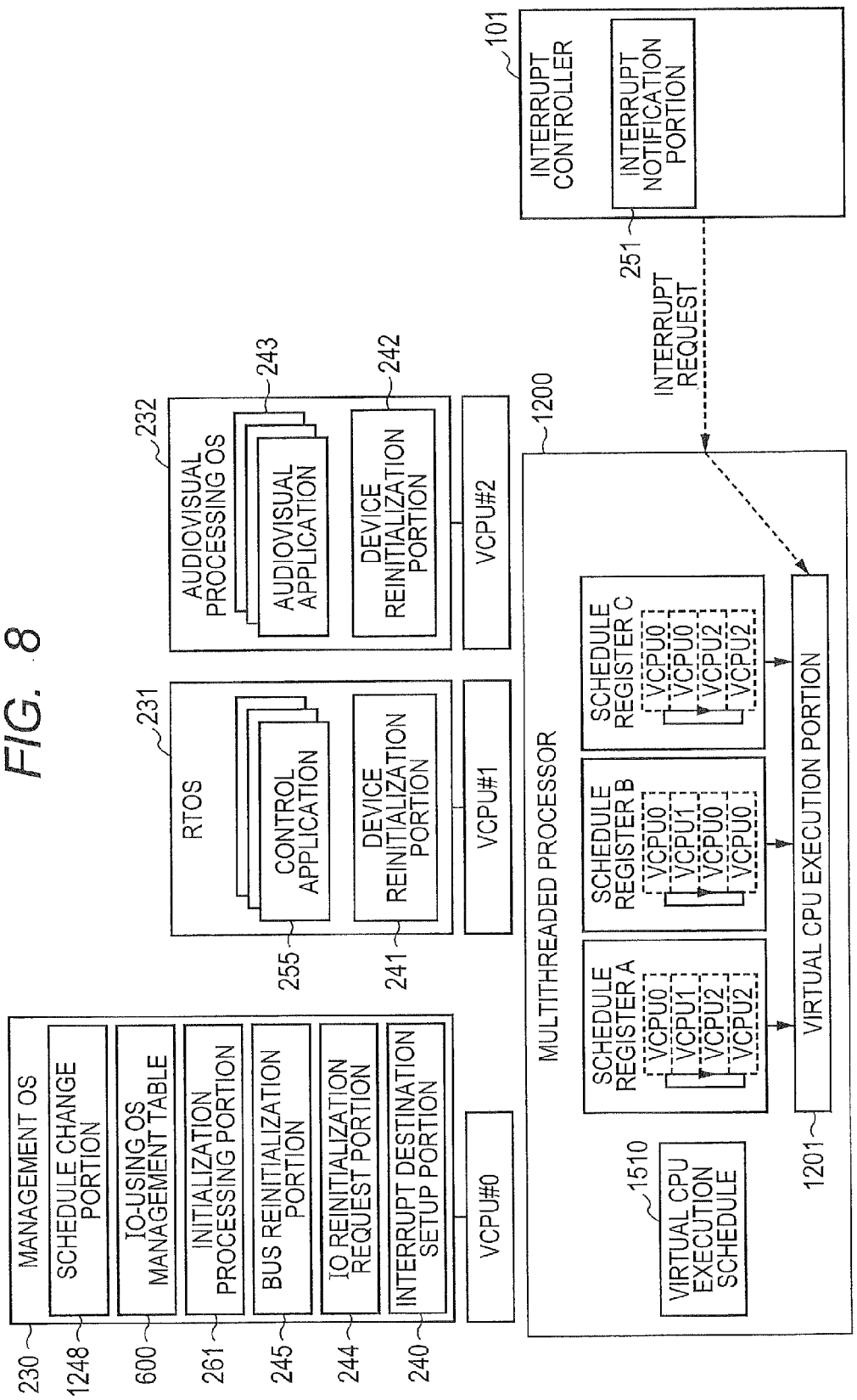
FIG. 8 illustrates a software configuration of the computer system according to a third embodiment.

FIG. 8 illustrates a software configuration of the computer system according to the third embodiment.

The multithreaded processor 1200 includes schedule registers A, B, and C.

The schedule registers A, B, and C each include a sequence table and a register group. The sequence table specifies a sequence of virtual CPUs to be performed. The register group stores data used for the virtual CPU to be performed.

The sequence table of schedule register A is configured to cyclically perform VCPU#0, VCPU#1, VCPU#2, and VCPU#2 in order. VCPU#0, VCPU#1, and VCPU#2 are provided with corresponding register groups.

The sequence table of schedule register B is configured to cyclically perform VCPU#0, VCPU#1, VCPU#0, and VCPU#0 in order. VCPU#0 and VCPU#1 are provided with corresponding register groups.

The sequence table of schedule register C is configured to cyclically perform VCPU#0, VCPU#0, VCPU#2, and VCPU#2 in order. VCPU#0 and VCPU#2 are provided with corresponding register groups.

A schedule generation portion 1248 generates a schedule based on the IO-using OS management table 600 so as not to schedule an OS related to the bus error occurrence. The example enables schedule registers B and C.

A virtual CPU execution portion 1201 changes schedule registers to be selected in response to an interrupt request from the interrupt controller 101 or a request from the OS (software).

Operations

The following describes operations of the computer system according to the third embodiment.

Figure 9:
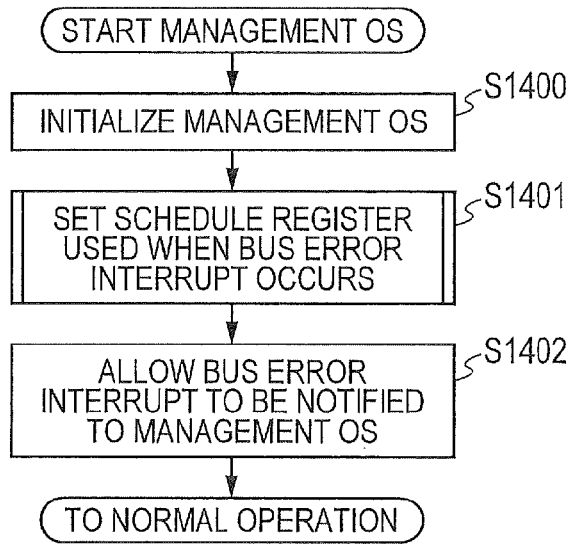
FIG. 9 is a flowchart illustrating a process to start the computer system according to the third embodiment.

FIG. 9 is a flowchart illustrating a process to start the computer system according to the third embodiment. VCPU#0 starts the computer system.

The initialization processing portion 261 normally initializes management OS 230 (S1400).

The schedule generation portion 1248 enables a schedule register used when a bus error interrupt occurs (S1401).

The interrupt destination setup portion 240 configures error notification (issued from the bus bridges 120 through 122) from the buses 111 through 113 to be notified to the management OS 230 (S1402).

The management OS then proceeds to normal operation.

Figure 10:
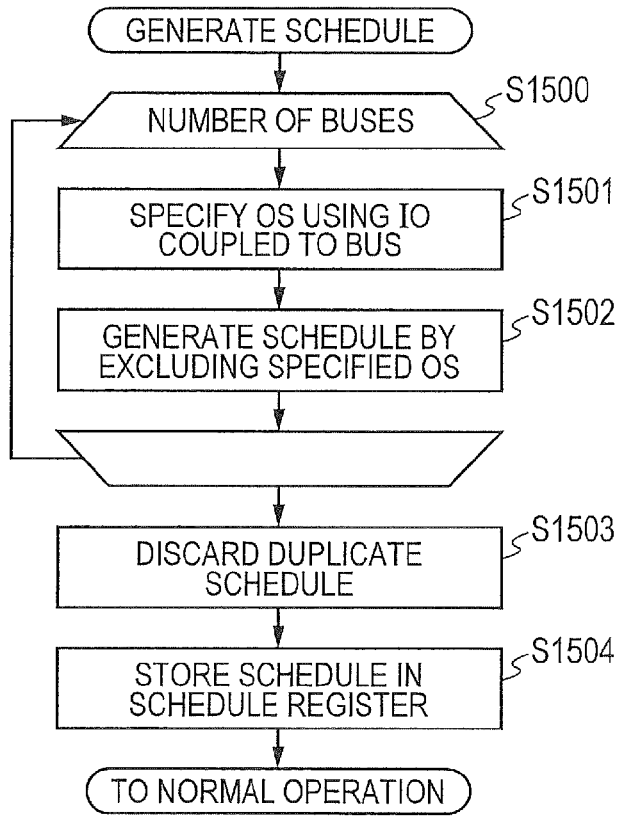
FIG. 10 is a flowchart illustrating a process to generate a schedule according to the third embodiment if a bus error interrupt occurs.

FIG. 10 is a flowchart illustrating a process to generate a schedule according to the third embodiment if a bus error interrupt occurs. The following description provides an example and the other different schedule generation algorithms may be available without departing from the spirit and scope of the invention.

Steps S1501 through S1502 are repeated for the number of buses in the bus list (S1500).

The schedule generation portion 1248 references the IO-using OS management table 600 and specifies an IO coupled to the selected bus. According to the example, the schedule generation portion 1248 specifies the IO 130 and the bus bridge 122 when the bus 111 is selected. The schedule generation portion 1248 specifies an OS using these IOs (S1501). According to the example, the schedule generation portion 1248 specifies only an audiovisual processing OS 1232.

The schedule generation portion 1248 generates a schedule in schedule register A as the standard schedule register to change VCPU#X to VCPU#0. VCPU#X allows the specified OS to operate and represents one or more of VCPU#0 through VCPU#2. According to the example, VCPU#2 is changed to VCPU#0. The schedule generation portion 1248 adds the schedule to a virtual CPU execution schedule 1510.

After S1500, the virtual CPU execution schedule 1510 contains as many schedules as the number of buses in the bus list.

The schedule generation portion 1248 removes duplicate schedules from the virtual CPU execution schedule 1510 (S1503).

The schedule generation portion 1248 supplies schedules in the virtual CPU execution schedule 1510 to the schedule registers (schedule registers B and C in this example). The schedule generation portion 1248 supplies the schedule registers to the virtual CPU execution portion 201 so that the schedule registers are selected if a bus error occurs (S1504).

Figure 11:
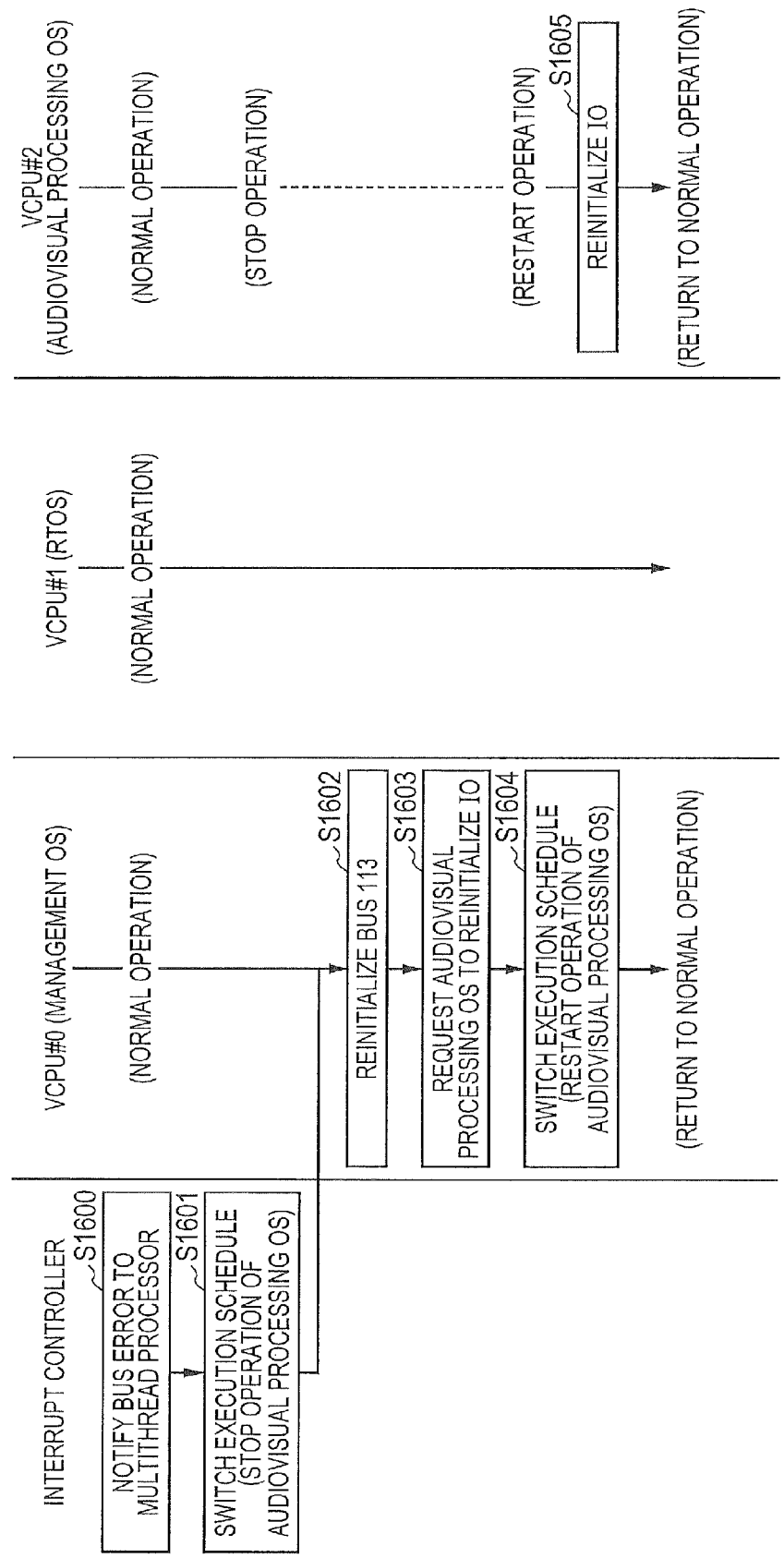
FIG. 11 is a flowchart illustrating a process to recover from an error on the bus 113 according to the third embodiment.

FIG. 11 is a flowchart illustrating a process to recover from an error on the bus 113 according to the third embodiment.

If an error occurs on the bus 113, the bus bridge 122 notifies the error occurrence to the interrupt controller 101. The interrupt controller 101 notifies the interrupt to the multithreaded processor 1200 (S1600).

The virtual CPU execution portion 1201 selects a schedule register (schedule register B in this example) corresponding to the bus causing the error and changes the execution schedule (S1601). At S1601, the audiovisual processing OS 232 stops operating.

The bus reinitialization portion 245 reinitializes the bus 113 (S1602). S1602 removes the error occurred on the bus 113.

The IO reinitialization request portion 244 requests the audiovisual processing OS 232 to reinitialize devices (S1603).

The virtual CPU execution portion 201 changes the schedule register to be used to the standard schedule register (schedule register A) and changes the execution schedule (S1604). At S1604, the audiovisual processing OS 1232 restarts operating.

The device reinitialization portion 242 reinitializes devices used for the audiovisual processing OS 232 (S1605) and restores the bus and devices coupled to the bus to normal states. The audiovisual processing OS 232 then returns to normal operation.

Effect

As described above, the embodiment reinitializes a bus while stopping all OS's related to the bus. A bus error can be removed safely. Even if the OS related to the bus does not complete a procedure of making a request to IOs (e.g., wait for DMA completion), requesting that OS to reinitialize IOs ensures a repeated request to IOs. The OS can restart safely. In addition, OS's unrelated to the bus can continue operating. The recovery process is available without stopping the real-time process.

The disclosed embodiments are examples in all aspects and should not be considered restrictive. The scope of the invention is shown in the appended claims, not in the above-mentioned description, and is intended to include meanings equivalent to the claims and all changes in the claims.

What is claimed is:

1. A computer system comprising:
   an interrupt controller to notify a bus error occurrence; and
   a multithreaded processor,
   wherein the multithreaded processor includes:
   a schedule register that settles a sequence of performing a plurality of virtual CPUs and stores data for virtual CPUs to be performed; and the schedule register includes a sequence table that is used to cyclically perform virtual CPUs;
a virtual CPU execution portion that performs virtual CPUs according to a sequence settled by the schedule register;
wherein virtual CPUs operate different OS's and include a first virtual CPU that operates a management OS to manage other OS's;
wherein, when notified of bus error occurrence, the virtual CPU execution portion operates only the first virtual CPU and stops other VCPUs regardless of an execution sequence settled in the schedule register, and
wherein the first virtual CPU reinitializes a bus where an error occurred;
wherein the first virtual CPU requests the other virtual CPUs to reinitialize a device to be used after bus reinitialization and allows the virtual CPU execution portion to perform a virtual CPU according to a sequence settled in the schedule register, and
wherein the other virtual CPUs reinitialize devices to be used.

2. The computer system according to claim 1,
wherein the first virtual CPU changes the execution sequence before the bus reinitialization so as to operate only the first virtual CPU and a second virtual CPU using a device not coupled to a bus where an error occurred.

3. The computer system according to claim 2,
wherein the first virtual CPU requests a third virtual CPU after bus reinitialization, using a device coupled to a bus causing an error, to reinitialize a device to be used and restores the execution sequence to an original state, and
wherein the third virtual CPU reinitializes a device to be used.

4. A computer system comprising:
an interrupt controller to notify a bus error occurrence; and
a multithreaded processor,
wherein the multithreaded processor includes:
a plurality of schedule registers each of which settles a sequence of performing a plurality of virtual CPUs and stores data for virtual CPUs to be performed; and
each schedule register includes a sequence table that is used to cyclically perform virtual CPUs;
a virtual CPU execution portion that performs virtual CPUs according to a sequence settled by a selected one of the schedule registers;
wherein virtual CPUs operate different OS's and include a first virtual CPU that operates a management OS to manage other OS's;
wherein, before being notified of bus error occurrence, the virtual CPU execution portion selects a first schedule register that includes all virtual CPUs as virtual CPUs to be performed;
wherein, when notified of bus error occurrence, the virtual CPU execution portion selects a schedule register that does not include, as a virtual CPU to be performed, a second virtual CPU using a device coupled to a bus where the error occurred, and
wherein the first virtual CPU reinitializes a bus where an error occurred;
wherein, after bus reinitialization, the first virtual CPU requests the second virtual CPU to reinitialize a device to be used and reenables the first schedule register to be selected, and
wherein the second virtual CPU reinitializes a device to be used.

* * * * *